(12) United States Patent
Chane-Ching

(10) Patent No.: US 7,495,033 B1
(45) Date of Patent: Feb. 24, 2009

(54) AQUEOUS COLLOIDAL DISPERSION BASED ON AT LEAST A LANTHANIDE COMPOUND AND A COMPLEXING AGENT A PROCESS FOR ITS PREPARATION AND USE THEREOF

(75) Inventor: Jean-Yves Chane-Ching, Eaubonne (FR)

(73) Assignee: Rhodia Terres Rares, La Rochelle Cedex (FR)

( * ) Notice: Subject to any disclaimer, the term of this patent is extended or adjusted under 35 U.S.C. 154(b) by 0 days.

(21) Appl. No.: 10/130,705

(22) PCT Filed: Nov. 21, 2000

(86) PCT No.: PCT/FR00/03228

§ 371 (c)(1),
(2), (4) Date: Feb. 27, 2003

(87) PCT Pub. No.: WO01/38225

PCT Pub. Date: May 31, 2001

(51) Int. Cl.
*B01F 13/00* (2006.01)
*C01F 17/00* (2006.01)
*C01B 13/36* (2006.01)

(52) U.S. Cl. ........................................ 516/89; 423/263
(58) Field of Classification Search ................... 516/89; 423/263
See application file for complete search history.

(56) References Cited

U.S. PATENT DOCUMENTS

| | | | | |
|---|---|---|---|---|
| 4,231,893 A | * | 11/1980 | Woodhead | 516/89 |
| 4,778,671 A | * | 10/1988 | Wusirika | 423/592.1 |
| 4,804,529 A | * | 2/1989 | Bardy et al. | 424/9.321 |
| 4,886,624 A | * | 12/1989 | Gradeff et al. | 516/20 |
| 5,545,386 A | | 8/1996 | Kaneyoshi et al. | |
| 5,716,547 A | * | 2/1998 | David | 516/89 |
| 5,733,361 A | * | 3/1998 | Chane-Ching et al. | 106/14.21 |
| 5,922,330 A | * | 7/1999 | Chane-Ching et al. | 516/89 |
| 6,090,743 A | * | 7/2000 | Chopin et al. | 502/302 |
| 6,271,269 B1 | * | 8/2001 | Chane-Ching et al. | 516/33 |
| 6,296,943 B1 | * | 10/2001 | Watanabe et al. | 428/447 |
| 6,472,811 B1 | * | 10/2002 | Justel et al. | 313/483 |
| 6,500,871 B1 | * | 12/2002 | Gerardin et al. | 516/89 |

FOREIGN PATENT DOCUMENTS

| | | | |
|---|---|---|---|
| EP | 0 043 633 | * | 1/1982 |
| EP | 0 206 870 | | 12/1986 |
| EP | 0 253 552 | | 1/1988 |
| EP | 0 304 369 | | 2/1989 |
| EP | 0 308 311 | | 3/1989 |
| EP | 0 379 814 | | 8/1990 |
| EP | 0 684 072 | | 11/1995 |
| EP | 0 820 092 A1 | * | 1/1998 |
| WO | WO 98/39253 | * | 9/1998 |

OTHER PUBLICATIONS

CRC Handbook of Chemistry and Physics, 61ST Edition 1980-1981, Robert C. Weast, PhD editor (CRC Press, Icn, Boca Raton, FL (1980-1981—month unavailable) pp. D-161 to D-167.*

* cited by examiner

*Primary Examiner*—Daniel S Metzmaier
(74) *Attorney, Agent, or Firm*—Buchanan, Ingersoll & Rooney, P.C.

(57) ABSTRACT

An aqueous colloidal dispersion of at least one lanthanide compound and a complexing agent with a pK (cologarithm of the dissociation constant of the complex formed by the complexing agent and the lanthanide cation) or more than 2.5. The dispersion can also include a compound of at least one other element selected from groups IVa, Va, VIIa, VIIa, VIII, Ib and IIb of the periodic table. A process for preparing the dispersion starts by forming an aqueous mixture comprising at least one lanthanide salt, optionally a salt of one of the elements mentioned, and the complexing agent. A base is added to the mixture, which is heated to obtain the dispersion. Methods that use the dispersion are also disclosed.

21 Claims, No Drawings

AQUEOUS COLLOIDAL DISPERSION BASED ON AT LEAST A LANTHANIDE COMPOUND AND A COMPLEXING AGENT A PROCESS FOR ITS PREPARATION AND USE THEREOF

The present invention relates to an aqueous colloidal dispersion based on at least one lanthanide compound and a complexing agent, to a process for its preparation, and to the use thereof.

Cerium sols, more particularly tetravalent cerium sols, are well known. Further, sols of trivalent lanthanides and in particular those of trivalent lanthanum and yttrium, can be of great interest, for example in catalysis or in the field of luminophores. However, such applications require sols constituted by fine (nanometric) particles. It is much more difficult to produce such sols with trivalent cations than using tetravalent cations. In the former case, rapid particle formation kinetics are observed which cause difficulties when stopping mineral polycondensation at the nanometric particle stage.

The invention aims to overcome such difficulties and produce nanometric lanthanide sols.

To this end, and in a first aspect, the aqueous colloidal dispersion of the invention is a dispersion of at least one compound of a lanthanide other than cerium or at least two lanthanide compounds, one of the lanthanides possibly being cerium, and is characterized in that it comprises a complexing agent with a pK (cologarithm of the dissociation constant of the catalytic formed by the complexing agent and the lanthanide cation) of more than 2.5.

In a second aspect, the aqueous colloidal dispersion of the invention is a dispersion of a cerium compound and is characterized in that it comprises a complexing agent with a pK (cologarithm of the dissociation constant of the complex formed by the complexing agent and the cerium cation) of more than 2.5 and a mean colloid size of at most 6 nm.

The dispersions of the invention can also comprise at least one other element selected from groups IVa, Va, VIIa, VIIa, VIII, Ib and IIb of the periodic table.

The invention also concerns a process for preparing the dispersions defined above, characterized in that it comprises the following steps:
    forming an aqueous mixture comprising at least one lanthanide salt and the complexing agent;
    adding a base to the mixture formed;
    heating the mixture to obtain a dispersion.

Further characteristics, details and advantages of the invention will become apparent from the following description and the various non-limiting examples that serve to illustrate it.

The term "lanthanide" as used in the present description means elements from the group constituted by yttrium and elements from the periodic table with atomic numbers in the range 57 to 71 inclusive. More particularly, the present invention is applicable to colloidal dispersions wherein the lanthanides are in the trivalent form.

The periodic table referred to is that published in the "Supplement au Bulletin de la Société Chimique de France" ["Supplement to the Journal of the French Chemical Society"], no 1 (January 1966).

Further, in the remainder of the description, the expression "colloidal dispersion" or "sol" of lanthanide compound or another element of the type defined above means any system constituted by fine solid particles of colloidal dimensions generally based on the oxide and/or hydrated oxide (hydroxide) of the lanthanide or, optionally, the oxide and/or hydrated oxide (hydroxide) of the lanthanide and the other element and also based on the complexing agent, in suspension in an aqueous liquid phase, said species also possibly containing residual quantities of bound or adsorbed ions such as nitrates, acetates, citrates, ammonium ions or the complexing agent in its ionised form. It should be noted that in such dispersions, the lanthanide or other element can be either completely in the form of colloids, or simultaneously in the form of ions, complexed ions and in the form of colloids.

The term "complexing agent" as used in the present description means a compound or a molecule that can establish a covalent or iono-covalent bond with the lanthanide cation and/or the cation of the other element. Suitable complexing agents for use in the present invention are complexing agents with a high complex dissociation constant Ks, the complex under consideration here being the complex formed by the complexing agent and the lanthanide cation or, if appropriate, complexes formed by the complexing agent and the lanthanide and the complexing agent and said element. An example of the equilibrium is given below:

$$(Ln,I)^{2+} \rightleftharpoons Ln^{3+} + I^-$$

where Ln represents the lanthanide or possibly an element of the type defined above, I represents the complexing agent and I⁻ represents the complexing anion;

the dissociation constant for the complex, Ks, is given by the formula:

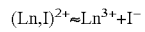

$$Ks = [Ln^{3+}] \times [I^-]/[(Ln,I)^{2+}]$$

The pK is the cologarithm of Ks. The more stable the complex $(Ln,I)^{2+}$, the higher the pK.

Suitable complexing agents for use in the present invention are those with a pK of more than 2.5, preferably at least 3.

The complexing agent can in particular be selected from acid-alcohols or polyacid-alcohols or salts thereof. Examples of acid-alcohols that can be cited are glycolic acid and lactic acid. Examples of polyacid-alcohols that can be cited are malic acid and citric acid.

The complexing agent can also be selected from aminated aliphatic acids, preferably aminated aliphatic polyacids, or salts thereof. Examples of such complexing agents which can be cited are ethylene-diamino-tetra-acetic acid or nitrilo-tri-acetic acid, or the sodium salt of N,N-diacetic glutamic acid with formula $(NaCOO—)CH_2CH_2—CH(COONa)N(CH_2COO^-Na)_2$.

Other suitable complexing agents which can be used are polyacrylic acids and their salts such as sodium polyacrylate, more particularly those with a mass average molecular mass in the range 2000 to 5000.

Finally, it should be noted that one or more complexing agents can be present in the same dispersion.

The amount of complexing agent, expressed as the number of moles of complexing agent with respect to the number of moles of lanthanide, can be in the range 0.1 to 1.5, more particularly in the range 0.5 to 1.5. This amount is determined by chemical assay of the carbon and lanthanide of the colloids recovered after ultracentrifuging at 50000 rpm for 6 hours. This amount is applicable to the sum of the complexing agents if a plurality of complexing agents are present in the dispersion.

In the case of the first embodiment, the dispersion of the invention is based either on a single compound of a lanthanide which in this case is other than cerium, or on at least two lanthanide compounds, one of the lanthanides possibly being cerium.

The second embodiment concerns a dispersion of a cerium compound, more precisely a dispersion containing only cerium as the lanthanide. This dispersion comprises a complexing agent of the same type as that described for the first embodiment.

The dispersions of the invention are nanometric in type. This means dispersions the colloids of which are generally of the size of at most 100 nm, preferably at most 10 nm.

Then in the second embodiment, and as a particular variant in the case of the first embodiment, the mean size of the colloids of the dispersions is at most 6 nm. More particularly, this mean size can be at most 5 nm, and can in particular be in the range 2 nm to 5 nm.

The defined diameters are determined by photometric analysis using HRTEM (high resolution transmission electron microscopy), if necessary completed by cryo-microscopy.

In addition to their small size, the aggregation state of the colloids of the dispersions of the invention is very slight. Transmission electron cryo-microscopy analysis indicates a low degree of colloid aggregates, for example of less than 10% by number, or even less than 5% by number, i.e., of all of the observed objects, at most 10% are constituted by several aggregated particles.

The pHs of the dispersions of the invention can fall within a wide range, for example in the range 5 to 10, more particularly in the range 7 to 9.5, which enables them to be used in applications wherein a near neutral pH is required.

Other embodiments of the dispersions of the invention will now be described. It should be noted that all of the characteristics which have been described above are also applicable to these embodiments.

The dispersions of the invention can comprise compounds of at least two lanthanides, for example dispersions based on yttrium and europium, or those based on yttrium and terbium.

Dispersions based on at least one lanthanide compound, which also comprise a compound of at least one element selected from groups IVa, Va, VIIa, VIIa, VIII, Ib and IIb of the periodic table, should also be mentioned.

When said element is present, the lanthanide/(lanthanide+ other element) mole ratio is at least 50%.

More particular examples of group IVa elements that can be cited are titanium and zirconium.

A particular example of a group Va element than can be cited is vanadium.

More particular examples of group VIa elements are chromium and molybdenum, with manganese as examples of group VIa elements.

More particular examples of group VIII elements which can be cited are iron, cobalt and nickel. In the same group, precious metals such as platinum, iridium, gold, ruthenium, rhodium and palladium can be cited.

Copper, silver and zinc can be selected from groups Ib and IIb respectively.

Dispersions in accordance with the first embodiment which can be mentioned are those based on lanthanum and iron, cerium and titanium, and on cerium and iron. Regarding the precious metals, dispersions that can be cited are those based on lanthanum and platinum or those based on lanthanum and palladium.

It should be noted here that for the dispersions of the embodiments just described, i.e., based on at least two lanthanides or at least one lanthanide and at least one element from the periodic table groups described above, the amount of complexing agent, expressed as the number of moles of complexing agent with respect to the total number of moles of the whole of the lanthanides and the elements cited above, can be in the same proportions as those given above.

The concentrations of the dispersions of the invention are at least 20 g/l, but can be more than 100 g/l, the concentrations being expressed as the equivalent concentration of lanthanide oxide or lanthanide oxide and oxide of the said element or elements. The concentration is determined after drying and calcining a given volume of dispersion in air.

The manner of preparing the dispersions will now be described.

The first step of the preparation process consists of forming an aqueous mixture comprising a lanthanide salt and the complexing agent. This mixture can also comprise at least one salt of an element from the groups cited above in the case of preparing the dispersions based on at least one of these elements. It is also possible to prepare a first mixture with a lanthanide salt and a first complexing agent and a second mixture with said element and the same complexing agent or a different complexing agent.

A trivalent salt is generally used as the lanthanide salt.

The salts can be salts of inorganic or organic salts, for example of the sulphate, nitrate, chloride or acetate type. It should be noted that the nitrate and acetate are particularly suitable. More particular cerium salts that can be used are cerium III acetate, cerium III chloride, cerium III nitrate or cerium IV nitrate and mixtures of these salts such as acetate/chloride mixtures.

In the starting mixture, the amount of complexing agent can be in the range 0.25 to 2.

The second step of the process consists of rendering basic the previously prepared mixture or mixtures. Then a base is added. In particular, the base can be hydroxide type products. Alkali or alkaline-earth hydroxides or ammonia can be cited. It is also possible to use secondary, tertiary or quaternary amines. However, amines and ammonia are preferred as they reduce the risk of pollution by alkali or alkaline-earth cations.

The base is added ("basification") until a pH is obtained the value of which depends on the nature of the lanthanide and on the nature and amount of complexing agent. In particular, the pH is lower when the amount of complexing agent is higher. In general, addition is continued until a pH is obtained at which the precipitate which is formed in the first part of the basification step begins to dissolve. In the case described above, in which two starting mixtures have been prepared, these two mixtures are combined after basification and the pH is adjusted if necessary.

The third step of the process is a heat treatment, also known as thermohydrolysis, which consists of heating the basified mixture obtained from the preceding step. The heating temperature is at least 60° C., preferably at least 100° C., and can be as high as the critical temperature of the reaction medium.

This treatment can be carried out either at normal atmospheric pressure or at a pressure such as the saturated vapour pressure corresponding to the temperature of the heat treatment, depending on the temperatures used. When the treatment temperature is higher than the reflux temperature of the reaction mixture (i.e., generally over 100° C.), the operation is conducted by introducing the aqueous mixture into a closed chamber (closed reactor, normally known as an autoclave), the necessary pressure then only resulting from heating the reaction mixture (autogenous pressure). Under the temperature conditions given above, and in an aqueous medium, an illustrative pressure in the closed reactor can be in the range from a value over 1 bar ($10^5$ Pa) to 165 Pa ($165 \times 10^5$ Pa), preferably in the range 1 bar ($5 \times 10^5$ Pa) to 20 bar ($100 \times 10^5$ Pa). Clearly, it is also possible to exert an external pressure which is then added to that due to heating.

Heating can be carried out either in an atmosphere of air, or in an atmosphere of an inert gas, preferably nitrogen.

The treatment period is not critical, and can fall within a wide range, for example in the range 1 to 48 hours, preferably in the range 2 to 24 hours.

After the treatment, the dispersion of the invention is obtained.

In a variation of the invention, the dispersion obtained can be treated by ultrafiltration. This treatment can take place immediately after the preceding step, or subsequent thereto.

Ultrafiltration can be carried out in air or in an atmosphere of air and nitrogen, or in nitrogen. The atmosphere under which these operations take place plays a role in the transformation of the lanthanide III to the lanthanide IV in the case of dispersions containing a lanthanide which can be tri- or tetravalent. It is preferably carried out with water adjusted to the pH of the dispersion. It may allow the dispersion to be concentrated.

The dispersions of the invention can be used in a variety of applications. Catalysis in particular can be cited, more particularly automobile post combustion, in which case the dispersion is used in preparing catalysts. The dispersions can also be used for lubrication, in ceramics, and for manufacturing luminophore compounds. The dispersions can also be used for their anti-UV properties, for example in preparing polymer films (for example acrylic or polycarbonate type) or for cosmetic compositions, in particular in preparing anti-UV creams. Finally, they can be used as a substrate for anti-corrosion agents.

Examples will now be given.

EXAMPLE 1

This example concerns an aqueous colloidal dispersion of lanthanum.

105.9 g of lanthanum nitrate containing 2.36 moles/kg (i.e., 0.25 moles of La) was added to a beaker followed by 50 g of citric acid (W=192 g) (i.e., 0.26 moles of citric acid) and made up to 500 cm$^3$ with demineralised water. After commencing stirring, the pH of the solution was 0.63. A dosing pump was then used to add 131 cm$^3$ of a 10.58 M ammoniacal solution at an addition rate of 2 ml/min. The pH was then 9.0.

The mixture was autoclaved at 125° C. (P=1.6 bar) for 3 h 30 minutes with a stirring rate of 300 rpm. The product had a milky appearance. After two days, the product became less opaque.

Washing was carried out by ultrafiltration (3 KD membrane) by passing a volume of water equal to 1.5 times the initial volume of the dispersion (addition of 300 cm$^3$/g of water for 200 cm$^3$ of dispersion). After this ultrafiltration wash, 200 cm$^3$ of washed dispersion was recovered, which was assayed to contain 0.36 M of La.

Transmission electron cryo-microscopy indicated a colloid size of the order of 3 nm and no aggregates were observed.

The pH of the dispersion was 9.0.

This dispersion was ultracentrifuged at 50000 rpm for 6 hours. The residue was assayed for La and C and produced a citric acid/La mole ratio in the colloids of 0.8.

EXAMPLE 2

This example concerns an aqueous colloidal dispersion of yttrium.

38.3 g of yttrium nitrate containing 382.7 g/mole (i.e., 0.1 moles of Y) was added to a beaker followed by 16 g of citric acid (W=192 g) (i.e., 0.08 moles of citric acid) and made up to 200 cm$^3$ with demineralised water (i.e., a citric acid/moles of Y mole ratio of 0.83).

After commencing stirring of a 50 ml aliquot, a dosing pump was then used to add 9.8 cm$^3$ of a 10.00 M ammoniacal solution. The pH was then 8.3.

The mixture was autoclaved at 120° C. (P=1.6 bar) overnight in a Parr bomb calorimeter. The product obtained had a colloidal appearance.

The pH of the dispersion was 8.3.

Transmission electron cryo-microscopy indicated a colloid size of the order of 3 nm.

This dispersion was ultracentrifuged at 50000 rpm for 6 hours. For a colloidal dispersion mass of 30.59 g, 3.49 g of moist colloids was recovered.

The residue was assayed for Y and C and produced a citric acid/Y mole ratio in the colloids of 0.7.

EXAMPLE 3

This example concerns a mixed aqueous colloidal dispersion of yttrium and europium.

40.66 g of yttrium nitrate containing 382.7 g/mole, 47.46 g of europium nitrate containing 446.7 g/mole and 34 g of citric acid ($C_6H_8O_7$) were placed in a beaker and made up to 425 cm$^3$ with demineralised water. The Y/Eu mole ratio was 1/1 and the citric acid/(Y+Eu) ratio was 0.83/1. Stirring of the ensemble was commenced.

With stirring at ambient temperature and at a constant rate, the pH was adjusted to 7.8 by adding 81 ml of 10 M $NH_4OH$. About 504 ml of dispersion was obtained. The dispersion was placed in a Buchi autoclave (stirring at 200 rpm) at 120° C. for 6 hours. After leaving at ambient temperature for 2 days, a colloidal dispersion was recovered.

Transmission electron cryo-microscopy indicated individual colloids with a size of the order of 3 nm.

This dispersion was ultracentrifuged at 50000 rpm for 6 hours. For a colloidal dispersion mass of 30.5 g, 4.1 g of moist colloids was recovered.

The ultracentrifuged residue was assayed for Y and Eu: the Y/Eu mole ratio was 1/1.4.

EXAMPLE 4

This example concerns an aqueous colloidal dispersion based on lanthanum and iron.

101 g of $Fe(NO_3)_3,9H_2O$ (i.e., 0.25 mole) and 105.94 g of $La(NO_3)_3$ containing 2.36 mole/kg (i.e., 0.25 moles) were incorporated in a beaker. The volume was made up to 715 cm$^3$ with demineralised water.

50 cm$^3$/g of this solution in a concentration of 0.7 M (La+Fe) was added to a beaker in which 6.1 g of citric acid ($C_6H_8O_7$, $H_2O$), i.e., 0.029 moles of citric acid, had already been placed, giving a citric acid/metal ratio of 0.83/1. Stirring of the ensemble was commenced.

A 10 M ammonia solution was added, with stirring, at ambient temperature, at a controlled flow rate, until the pH was 6.3.

The dispersion obtained was autoclaved overnight at 120° C. in a Parr bomb calorimeter.

A colloidal dispersion was recovered.

Transmission electron cryo-microscopy indicated completely individual colloids with a size of the order of 3 nm.

After ultracentrifuging at 50000 rpm for 6 hours, an ultracentrifuged residue was recovered. Chemical assay of the residue showed that the colloids had a La/Fe mole ratio of 1 and a citric acid/(La+Fe) mole ratio of 0.65.

EXAMPLE 5

This example also concerns an aqueous colloidal dispersion based on lanthanum and iron, but with two complexing agents.

A solution A of ferric nitrate was prepared in the presence of a complexing agent, namely the commercially available sodium salt of N,N-diacetic glutamic acid (Nervanaid GBS 5) sold by Rhodia. Then 20.2 g of $Fe(NO_3)_3,9H_2O$ was placed in a beaker, 35.5 ml of a 1.41 M solution of GBS was added and made up to 100 ml with demineralised water. After commencing stirring, the pH of the solution was 3.88 and the concentration of the solution was 0.5 M of Fe and 0.5 M of complexing agent GBS. 3.97 ml of a 10 M ammonia solution was then added using a pump, with stirring. The pH of the dispersion was 8.0.

A solution B of ferric nitrate was prepared in the presence of a citrate complexing agent. 21.2 g of $La(NO_3)_3$ was placed in a beaker, 9.6 g of citric acid was added and made up to 100 ml with demineralised water. After commencing stirring, the pH of the solution was 0.5. The concentration of the solution was 0.5 M of La and 0.5 M of citrate. 18 ml of a 10 M ammonia solution was then added using a pump, with stirring. The pH of the dispersion was 8.0.

50 ml of solution A was then mixed with 50 ml of solution B, with stirring. The pH was 6.4. the pH was adjusted to 8.0 with 1.79 ml of 10 M ammonia. The medium obtained was autoclaved overnight at 120° C.

The colloidal dispersion obtained was red-black in colour.

After ultracentrifuging at 50000 rpm for 6 hours, a residue was recovered. Chemical assay of the residue showed that the La/Fe mole ratio was 1/0.66.

Transmission electron cryo-microscopy indicated completely individual colloids with a size of the order of 3 nm.

EXAMPLE 6

This example concerns an aqueous colloidal dispersion based on lanthanum and palladium.

33 g of the solid salt $La(NO_3)_3$ containing 2.36 M/kg and 15.62 g of citric acid were dissolved in a beaker and the final volume was made up to 156 $cm^3$ with demineralised water. The pH was 0.56. 49 $cm^3$ of concentrated 10.5 M $NH_4OH$ was added to produce a pH of 9.

30 $cm^3$ of a solution of $Pd(NO_3)_2$ containing 10% $Pd(NO_3)_2$ or 0.43 M of Pd was then added. The pH was 6.17. Adding 29 $cm^3$ of $NH_4OH$ produced a pH of 9.0. 103 g of demineralised water was added. The La/Pd atomic ratio was 1/0.16.

This solution was placed in a closed Buchi autoclave at 107° C. for 6 hours; a dispersion was obtained. The dispersion was allowed to mature for 2 days into a colloidal solution that was clear to the eye at ambient temperature before ultrafiltration.

345 ml of this colloidal solution was ultrafiltered in an ultrafiltration cell provided with a 3 KD membrane, at a pressure of 3 bars. The solution was washed using a total volume of 450 $cm^3$ of demineralised water. Ultrafiltration was carried out until the final volume of the colloidal solution was 175 $cm^3$. Assay of the colloidal solution indicated that the La concentration was 0.245 M and the Pd concentration was 0.015 M.

4 g of ultrafiltered colloidal solution was centrifuged at 50000 rpm for 6 hours.

Transmission electron cryo-microscopy indicated completely individual colloids with a diameter of about 3 µm.

The La/Pd atomic ratio, determined for the colloids by chemical assay of the colloids recovered by ultracentrifuging, was La/Pd=1/0.06.

EXAMPLE 7

This example concerns a cerium dispersion.

34.9 g of cerium (III) acetate containing 49.29% of $CeO_2$, 28.8 g of citric acid and 200 g of demineralised water were incorporated in a beaker. Stirring of the ensemble was commenced. The citric acid/cerium mole ratio was 1.5/1. The volume of the final solution was 235 $cm^3$.

0.3 ml/minute of a concentrated 10.4 M ammonia solution was added to obtain a pH of 7.5.

The dispersion was autoclaved overnight at 120° C. A colloidal dispersion was obtained.

After cooling for about 3 hours, the dispersion was washed with demineralised water and concentrated by ultrafiltering through a 3 KD membrane. Colour development was observed while washing; 120 ml of dispersion was washed with 6 times its volume of water. After washing, 60 ml was recovered.

After ultracentrifuging at 50000 rpm for 6 hours, a residue was obtained which confirmed the colloidal appearance of the dispersion.

Transmission electron cryo-microscopy indicated completely individual colloids with a diameter of about 3 nm.

The invention claimed is:

1. An aqueous colloidal dispersion comprising an aqueous liquid phase and particles of a size of at most 100 nm, wherein said particles consist of:
   (1) an oxide and/or hydrated oxide of at least two elements selected from the group consisting of lanthanides; or
   an oxide and/or hydrated oxide of at least two elements selected from the group consisting of the lanthanides, in combination with an oxide and/or hydrated oxide of at least one other element selected from the group consisting of iron and palladium;
   (2) a complexing agent with a pK (cologarithm of the dissociation constant of the complex formed by the complexing agent and the lanthanide cation) of more than 2.5, wherein the complexing agent is selected from the group consisting of acid- or polyacid-alcohols, polyacrylic acids and salts thereof; and
   (3) optionally, residual quantities of bound or adsorbed ions;
wherein said aqueous liquid phase comprises water, and optionally, residual quantities of ions or the complexing agent in ionized form.

2. A dispersion according to claim 1, wherein the mean size of the colloidal particles is in the range of 2 to 5 nm.

3. A dispersion according to claim 1, having a pH in the range of 5 to 10.

4. A dispersion according to claim 1, wherein the complexing agent has a pK of at least 3.

5. A dispersion according to claim 1, wherein the amount of complexing agent, expressed as the number of moles of complexing agent with respect to the number of moles of lanthanide, is in the range of 0.1 to 1.5.

6. A process for preparing a dispersion according to claim 1, which comprises the following steps:
   forming an aqueous mixture consisting essentially of at least one lanthanide salt and the complexing agent;
   adding a base to the mixture formed; and
   heating the mixture to obtain the colloidal dispersion according to claim 1.

7. A process according to claim 6, wherein heating is carried out at a temperature of at least 60° C.

8. A process according to claim 7, wherein the dispersion obtained from the heating undergoes ultrafiltration.

9. A process according to claim 6, wherein the dispersion obtained from the heating step undergoes an ultrafiltration step.

10. A process according to claim 6, wherein the heating is carried out at a temperature of at least 100° C.

11. A process for preparing a colloidal dispersion according to claim 1, which comprises the following steps:
    forming a first mixture consisting essentially of a lanthanide salt and a first complexing agent and a second mixture consisting essentially of an iron or palladium salt and the same or a different complexing agent;
    adding a base to each of the mixtures formed;
    combining the two mixtures; and
    heating the two combined mixtures to obtain a colloidal dispersion according to claim 1.

12. A process according to claim 11, wherein the heating is carried out at a temperature of at least 60° C.

13. A process according to claim 11, wherein the heating is carried out at a temperature of at least 100° C.

14. A process according to claim 11, wherein the dispersion obtained from the heating step undergoes ultrafiltration.

15. A dispersion according to claim 1, wherein the amount of complexing agent, expressed as the number of moles of complexing agent with respect to the number of moles of lanthanide and the number of moles of iron or palladium optionally present, is in the range of 0.1 to 1.5.

16. A process for preparing a colloidal dispersion according to claim 1, which comprises:
    forming an aqueous mixture consisting essentially of at least one lanthanide salt, a salt of iron and/or palladium, and the complexing agent;
    adding a base to the mixture formed; and
    heating the mixture to obtain a dispersion according to claim 1.

17. A dispersion according to claim 1, wherein the complexing agent is an acid- or polyacid-alcohol or a salt thereof.

18. A dispersion according to claim 1, having a pH in the range of 5 to 6.3.

19. A dispersion according to claim 1, wherein the element is lanthanum.

20. A dispersion according to claim 1, wherein the element is yttrium.

21. An aqueous colloidal dispersion comprising an aqueous liquid phase and particles of a size of at most 6 nm, wherein said particles consist of:
    (1) an oxide and/or hydrated oxide of an element selected from the group consisting of lanthanides other than cerium; or an oxide and/or hydrated oxide of at least two elements selected from the group consisting of lanthanides; or an oxide and/or hydrated oxide of an element selected from the group consisting of lanthanides other than cerium, in combination with an oxide and/or hydrated oxide of at least one other element selected from the group consisting of iron and palladium, or
    an oxide and/or hydrated oxide of at least two elements selected from the group consisting of the lanthanides, in combination with an oxide and/or hydrated oxide of at least one other element selected from the group consisting of iron and palladium; and
    (2) a complexing agent with a pK (cologarithm of the dissociation constant of the complex formed by the complexing agent and the lanthanide cation) of more than 2.5, wherein the complexing agent is an aliphatic aminated acid or a salt thereof; and
    (3) optionally, residual quantities of bound or adsorbed ions;
wherein said liquid aqueous phase comprises water and, optionally, residual quantities of ions or the complexing agent in ionized form.

* * * * *